Sept. 2, 1958     W. A. TAYLOR     2,849,969
SUBSOIL INJECTOR
Filed Nov. 16, 1953     2 Sheets-Sheet 2
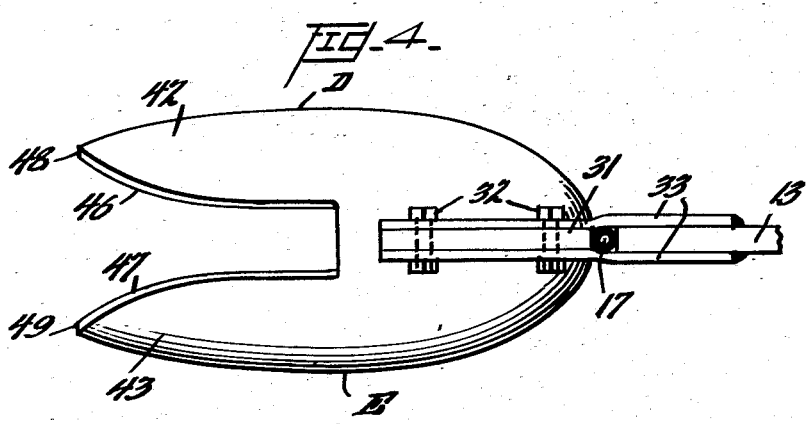
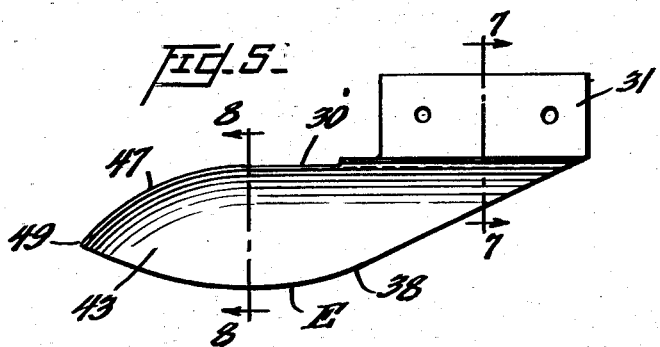
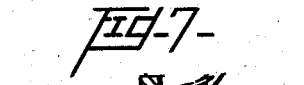
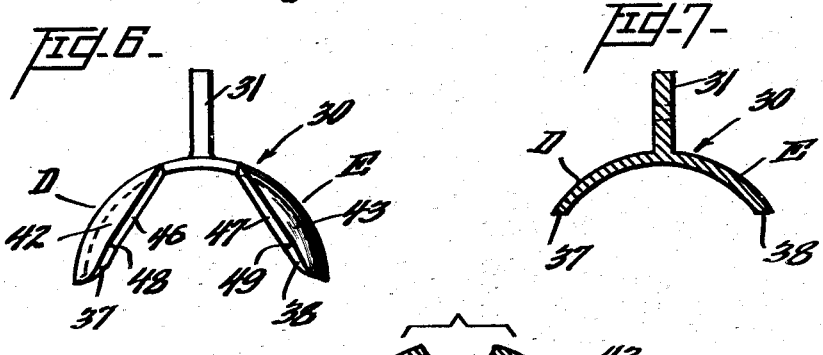
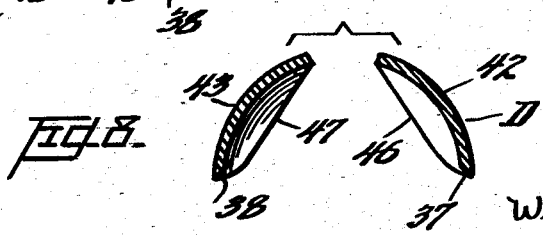
INVENTOR
William A. Taylor
BY Watson, Cole, Grindle & Watson
ATTORNEY United States Patent Office 2,849,969
Patented Sept. 2, 1958

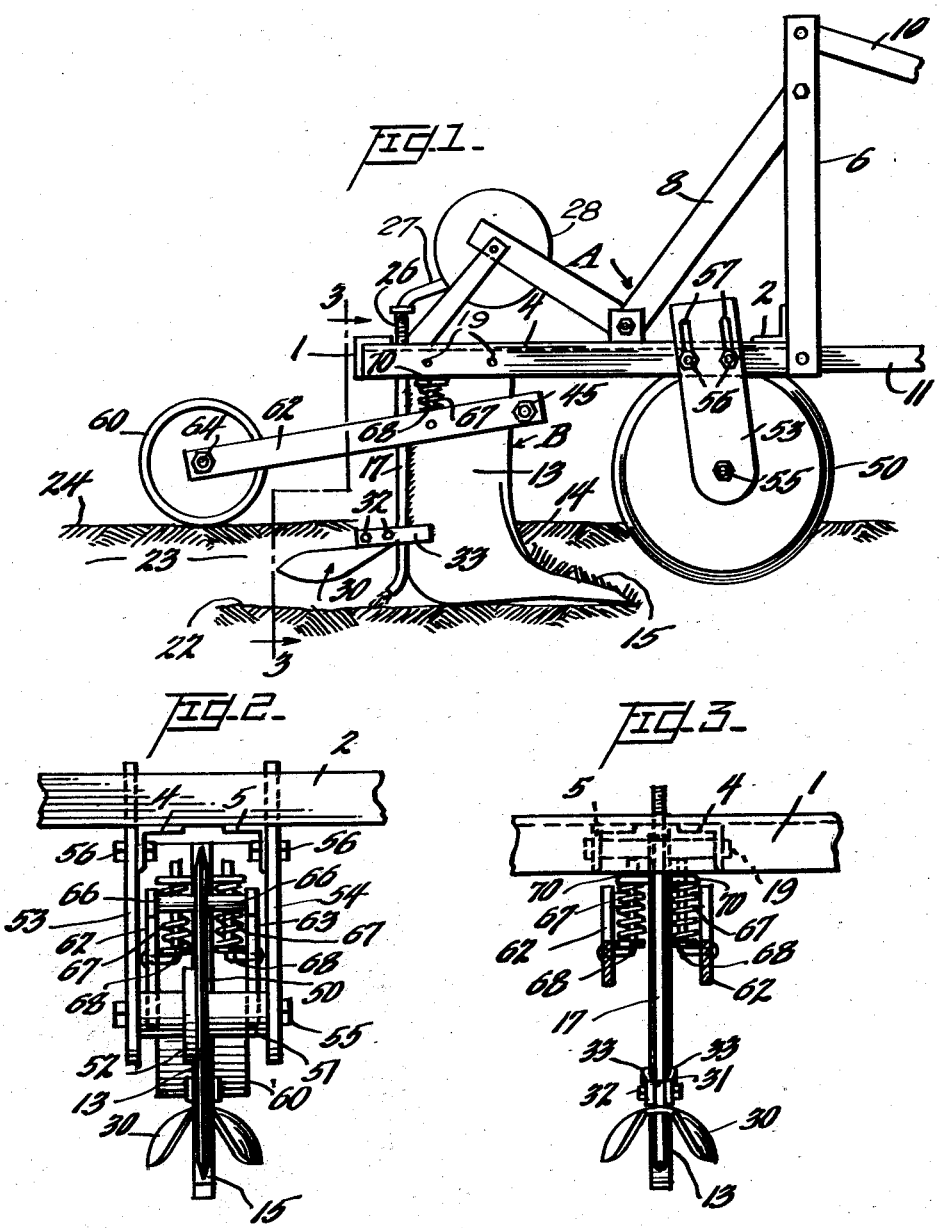

2,849,969
SUBSOIL INJECTOR

William A. Taylor, Louisville, Miss., assignor to Taylor Machine Works, Louisville, Miss., a corporation of Mississippi Application November 16, 1953, Serial No. 392,225

3 Claims. (Cl. 111—7)

This invention relates to agricultural implements and particularly to implements designed and intended for use in the fertilization of farm lands.

One of the most significant agricultural advances in recent years has been the introduction of anhydrous ammonia as a nitrogenous fertilizer. The highly beneficial fertilizing properties of anhydrous ammonia have now been established, but the proper application of such fertilizer has presented a serious problem.

Anhydrous ammonia is a gas at atmospheric pressure, and this fact underlies the problem of proper application. The highly volatile nature of anhydrous ammonia causes substantial losses due to evaporation and has heretofore made it impossible to realize the full benefits of this fertilizer.

The purpose of the present invention is to provide an agricultural implement which will overcome the above problem and permit proper application of highly volatile fertilizers such as anhydrous ammonia.

A further purpose of the present invention is to provide an agricultural implement having means for cutting an unusually narrow furrow and depositing the fertilizer therein. The narrow furrow limits the passage through which fertilizer vapors can escape regardless of whether the ground is sodded or broken, and has the further advantage of permitting fertilizer application in established sod without harmful disturbance of the sod.

A still further purpose of the present invention is to provide an agricultural implement having means adapted for travel underneath the ground surface to shave earth from the side walls of the furrow and to compact it over the fertilizer, thus sealing the fertilizer in the ground and preventing loss due to evaporation.

Another object of the present invention is to provide an agricultural implement with a trailing packer wheel to close the narrow furrow, thus further insuring against evaporation of the fertilizer and preventing damage to established sod due to drying out.

One embodiment of the invention will be disclosed in detail by way of example but it will be understood by one skilled in the art that, in adapting the invention to peculiar local conditions of soil and terrain, minor changes and adjustments of the parts may be made to increase the efficiency of the implement in accomplishing its functions. The implement selected for disclosure is illustrated in the accompanying drawings in which:

Figure 1 is a side elevation showing the implement in operating position in the ground;

Figure 2 is a partial, front elevational view on enlarged scale of the implement shown in Figure 1;

Figure 3 is a partial rear elevational view on enlarged scale, taken from the line 3—3 in Figure 1;

Figure 4 is an enlarged top plan view of a sealing member shown in side view in Figure 1;

Figure 5 is a side view of the sealing member shown in Figure 4;

Figure 6 is an end view taken from the left in Figure 5;

Figure 7 is a sectional view on the line 7—7 in Figure 5; and

Figure 8 is a sectional view on the line 8—8 in Figure 5.

As viewed in Figure 1, the agricultural implement provided by this invention is assembled on a frame indicated generally at A. The design of frame A is not critical in that its only purpose is to provide carrying and positioning means for the earth working parts. Frame A is shown as having parallel, running members 1 and 2 which are connected by parallel, supporting members 4 and 5. Attached to member 2 is an upright member 6 supported by brace member 8. The frame thus described may be drawn by any conventional power source, and bars 10 and 11 are indicated schematically as a means of attaching frame A to the power source (not shown). Frame A can be provided with supporting wheels; or a conventional type of draw-hitch may be used which will support frame A from the power source and allow the frame to be lifted for transportation above the ground when not in use.

The basic earth working and fertilizer conveying part of the implement is a boot unit indicated generally at B. Boot unit B includes a boot 13 and a fertilizer conveying pipe 17. Boot 13 is formed with a tapered leading edge 14 which blends into a wedge-shaped foot 15 having a sharpened leading edge. Boot 13 is secured midway between supporting members 4 and 5 as by bolts 19 and spacing sleeves 20 (Figure 3), thus rigidly positioning boot unit B relative to frame A.

Pipe 17 terminates at its lower end near the bottom of boot 13 so that the fertilizer will be deposited at the bottom 22 of the furrow 23. Line 24 indicates the top of the ground. The upper end of pipe 17 is threaded as at 26 to receive a coupling on the end of a connecting tube 27 which will connect pipe 17 and the fertilizer container 28. The container can, of course, be mounted on frame A, as shown, or on the power source.

The fertilizer conveying passage is shown as being defined by the separate pipe 17, which is welded to the trailing edge of boot 13. However, it will be understood that the fertilizer conveying passage could equally well be located within boot 13.

In order that the fertilizer deposited in the furrow 23 will not be free to evaporate from the open furrow, sealing member 30 is provided. As shown best in Figures 4 and 5 the sealing member 30 has a carrying lip 31 which is shown integral with the sealing member but which could be a separate member attached to the sealing member as by welding. As shown in Figures 1, 3 and 4, carrying lip 31 is attached by bolts 32 to ears 33 which are welded to the sides of boot 13. In this manner sealing member 30 is rigidly positioned directly behind and above the bottom of boot 13 and the discharge end of pipe 17.

The shape of sealing member 30 will now be described in detail with reference to Figures 4–8. Sealing member 30 has a generally concavo-convex shape, with the under surface being concave. This shape forms outwardly and downwardly extending symmetrical walls indicated generally as D and E, one on each side of the center-line of sealing member 30. Each of the sides D, E has a bottom edge 37 and 38, respectively. The distance between the bottom edges 37 and 38 is greater than the thickness of boot 13 so that sides D and E act to shave earth from the walls of furrow 23 and place it over the fertilizer delivered through pipe 17. It will be seen in Figure 5 that bottom edges 37 and 38 are inclined upwardly from about the center to the front of sealing member 30, where they meet at the top of member 30 to form a sharpened leading edge portion which helps to decrease drag. As seen in Figures 6 and 8 the side walls D and E are inclined inwardly toward each other at the rear to compress the earth collected by the forward portion of the walls. In order to prevent clogging and further limit the drag of sealing member 30, the upper portion of each side wall has been cut away as shown in Figure 4 from approximately the center to the trailing end of sealing member 30, thus forming blades 42 and 43 out of the rear portions of sides D and E respectively. Blades 42 and 43 have top edges 46 and 47, respectively, which are parallel near the center of member 30 and curve outwardly away from each other at the trailing end of member 30. In order still further to decrease drag and clogging, the bottom edges 37 and 38 of the blades are inclined upwardly for approximately the rear third of member 30 to meet top edges 46 and 47, respectively, thus forming two sharp trailing edges 48 and 49, as shown in Figures 4, 5, and 6. As explained above and shown in the drawings, sealing member 30 is streamlined so that it will cause no unnecessary drag during underground travel.

The implement thus far described could under some soil conditions, be used effectively by itself for the application of highly volatile fertilizers. However, the desired results are more fully attained by the addition of a rolling coulter 50 and a packer wheel 60, both as shown in Figure 1.

As shown in Figure 2, the coulter 50 is mounted on sleeve 51 at the center thereof by welding or otherwise securing it to flange 52 which is integral with the sleeve. Sleeve 51 is rotatively positioned between arms 53 and 54 by means of an axle-forming bolt 55. Arms 53 and 54 are adjustably secured to supporting members 4 and 5, respectively, by means of bolts 56 in slots 57, as shown in Figure 1. The wedge shaped foot 15 of boot 13 draws the boot and the coulter 50 down into the ground and at the same time lifts the ground under coulter 50, thus allowing the coulter to slice a well defined narrow furrow in the ground. The furrow cut by coulter 50 is widened slightly by boot 13 which is thicker than the coulter as seen in Figure 2.

Packer wheel 60 operates to close the furrow opened by coulter 50 and boot 13. This action further seals the fertilizer which has already been covered by a mound of earth through the action of sealing member 30. The use of wheel 60 is especially desirable in connection with established sod since it closes the earth's surface thereby preventing the sod from drying out. Packer wheel 60 is rotatably mounted between the rearward ends of arms 62 and 63 by means of axle-forming bolt 64. Arms 62 and 63 are pivotally supported at their forward ends by means of a bolt 65 which passes through a flange (not shown) welded to the front of boot 13. The forward ends of arms 62 and 63 are held in spaced-apart relation by means of spacing sleeves 66 shown in Figure 2. In order to force wheel 60 into contact with the ground, compression springs 67 are provided. Springs 67 are mounted over the long legs of L-shaped rods 68, and bear at their lower ends on the short legs of rods 68, which short legs pass through arms 62 and 63, one spring and rod being provided for each of the arms 62, 63. The upper ends of springs 67 bear against flanges 70 which are welded on the sides of boot 13. The long legs of rods 68 pass through and are free to slide in holes provided in flanges 70, there being one flange for each rod and spring unit.

The direction in which the above described implement is drawn to accomplish its fertilizing function is from left to right as viewed in Figure 1. It should also be observed in Figure 1 that in the normal operation of the implement, sealing member 30, is entirely below the surface of the ground and hence below the bottom of packer wheel 60.

Frame A has been described as having only one row of earth working elements. Obviously, as many rows as desired may be mounted on one frame, and, as shown in Figures 2 and 3 running members 1 and 2 can continue in both directions for the reception of additional rows of earth-working members.

Although the implement has been described as designed primarily for the application of highly volatile fertilizers it is obvious that it might also be used to advantage in applying other types of fertilizers, whether liquid or solid, and also for sowing seed.

Having thus described the invention, what is claimed as new and desired to be secured by Letters Patent is:

1. In an agricultural implement for introducing volatile fertilizer materials and the like into the earth below the normal surface thereof, a reservoir for said fertilizer material adapted to be mounted on said implement, a narrow boot unit having a sharp leading edge, said boot being adapted when drawn through the earth to open a deep narrow furrow therein; a generally downwardly extending passage in said boot terminating in a discharge opening by means of which said material may be fed into said furrow adjacent the bottom thereof, said passage being in communication with said reservoir; and sealing means positioned immediately rearwardly of said boot unit at an operative level spaced below the normal surface of the earth, said sealing unit being of a transverse width substantially in excess of that of the boot unit and having a center portion and lateral wings extending downwardly therefrom, the portions of said wings adjacent their trailing edges being inclined inwardly toward each other, said wings extending downwardly substantially to the level of the discharge opening, whereby in operation said sealing unit positively removes a strip of earth from each of the furrow walls along a locus spaced from the normal surface of the earth and compresses said strips together into a compacted narrow sub-stratum of earth overlying said material.

2. The implement of claim 1 wherein said sealing means has a solid leading portion from which said wings extend rearwardly and downwardly, the portion of said wings rearward of said leading portion being spaced apart, the extreme rear portion of the bottom edges of said wings being curved inwardly and the extreme rear portion of the upper edges of said wings being curved downwardly and outwardly whereby said sub-stratum is essentially dome-shaped in transverse cross-section.

3. In an agricultural implement for introducing volatile fertilizer materials and the like into the earth below the normal surface thereof, a reservoir for said fertilizer material adapted to be mounted on said implement, a narrow boot unit having a sharp leading edge, said boot being adapted when drawn through the earth to open a deep narrow furrow therein, thereby disrupting upwardly the adjacent surface portions of the earth; a generally downwardly extending passage in said boot by means of which said material may be fed into said furrow adjacent the bottom thereof, said passage being in communication with said reservoir; sealing means positioned immediately rearwardly of said boot unit at an operative level spaced below the normal surface of the earth, said sealing unit being of a transverse width substantially in excess of that of the boot unit and having a center portion and lateral wings extending downwardly therefrom, the portions of said wings adjacent their trailing edges being inclined inwardly toward each other, whereby in operation said sealing unit positively removes a strip of earth from each of the furrow walls along a locus spaced from the normal surface of the earth and compresses said strips together into a compacted narrow sub-stratum of earth overlying said material; and packing means including a packer wheel contacting the disrupted surface portions of the earth and at least substantially restoring them to original condition, said sealing unit being below the bottom of said packer wheel in the normal operation of said implement.

(References on following page)

References Cited in the file of this patent

UNITED STATES PATENTS

| | | | |
|---|---|---|---|
| 31,313 | Hammer et al. | Feb. 5, | 1861 |
| 1,082,430 | Mallory | Dec. 23, | 1913 |
| 1,371,101 | Lee | Mar. 8, | 1921 |
| 1,693,318 | Shell | Nov. 27, | 1928 |
| 1,962,116 | Atwater | June 12, | 1934 |
| 2,259,303 | Ewerth | Oct. 14, | 1941 |
| 2,285,932 | Leavitt | June 9, | 1942 |
| 2,439,743 | McEwen | Apr. 13, | 1948 |
| 2,619,054 | Bell | Nov. 25, | 1952 |
| 2,706,363 | Arnold | Apr. 19, | 1955 |
| 2,722,902 | Hyatt | Nov. 8, | 1955 |

FOREIGN PATENTS

| | | | |
|---|---|---|---|
| 283,035 | Great Britain | Jan. 5, | 1928 |
| 292,205 | Italy | Jan. 11, | 1932 |